United States Patent
Kato

(10) Patent No.: US 9,906,475 B2
(45) Date of Patent: Feb. 27, 2018

(54) INFORMATION PROCESSING APPARATUS, COMMUNICATION SYSTEM, NON-TRANSITORY COMPUTER READABLE MEDIUM, AND INFORMATION PROCESSING METHOD

(71) Applicant: FUJI XEROX CO., LTD., Tokyo (JP)

(72) Inventor: Junya Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 355 days.

(21) Appl. No.: 14/528,173

(22) Filed: Oct. 30, 2014

(65) Prior Publication Data

US 2015/0341295 A1 Nov. 26, 2015

(30) Foreign Application Priority Data

May 20, 2014 (JP) .................................. 2014-104257

(51) Int. Cl.
| | |
|---|---|
| G06F 15/16 | (2006.01) |
| H04L 12/58 | (2006.01) |
| H04L 29/06 | (2006.01) |
| G06F 21/41 | (2013.01) |
| G06F 21/33 | (2013.01) |
| H04L 29/08 | (2006.01) |

(52) U.S. Cl.
CPC ............ *H04L 51/12* (2013.01); *G06F 21/335* (2013.01); *G06F 21/41* (2013.01); *H04L 51/18* (2013.01); *H04L 51/28* (2013.01); *H04L 63/10* (2013.01); *H04L 67/2819* (2013.01); *G06F 2221/2117* (2013.01)

(58) Field of Classification Search
CPC ......... H04L 63/08; H04L 51/12; H04L 63/10; H04L 51/28; G06F 3/1288; G06F 21/335
See application file for complete search history.

(56) References Cited

U.S. PATENT DOCUMENTS 8,014,756 B1 * 9/2011 Henderson ........... G06Q 10/103
455/411
8,042,177 B2 10/2011 Salgado
(Continued)

FOREIGN PATENT DOCUMENTS

CN 103380614 A 10/2013
JP 2012-113696 A 6/2012

OTHER PUBLICATIONS

Mar. 29, 2016 Examination Report issued in Australian Patent Application No. 2015200404.
(Continued)

*Primary Examiner* — Shean Tokuta
(74) *Attorney, Agent, or Firm* — Oliff PLC

(57) ABSTRACT

An information processing apparatus includes a memory, a transmission unit, and a permission unit. The memory stores an identification of a client apparatus, a first mail address assigned to a first user, and first permission information indicating that the first user has authority to use a service, while associating the identification, the first mail address, and the first permission information with one another. The transmission unit transmits, in a case where the identification has been received from the client apparatus, a first email addressed to the first mail address stored in association with the identification that has been received. The permission unit permits, in a case where a reply corresponding to contents of the first email has been received from a terminal, use of the service in accordance with the first permission information stored in association with the first mail address.

10 Claims, 12 Drawing Sheets

(56) References Cited

U.S. PATENT DOCUMENTS

| | | | |
|---|---|---|---|
| 8,683,566 B1* | 3/2014 | Gailloux | G06F 21/31 |
| | | | 726/3 |
| 9,001,370 B1* | 4/2015 | Nuggehalli | H04L 63/083 |
| | | | 358/1.15 |
| 2012/0117629 A1 | 5/2012 | Miyazawa et al. | |
| 2012/0222062 A1* | 8/2012 | Strickland | G06F 17/30867 |
| | | | 725/30 |
| 2013/0007849 A1* | 1/2013 | Coulter | G06F 21/10 |
| | | | 726/4 |
| 2013/0152171 A1* | 6/2013 | Kindler | H04L 63/08 |
| | | | 726/4 |
| 2013/0293351 A1* | 11/2013 | Kuenzi | G06F 21/35 |
| | | | 340/5.73 |
| 2014/0258377 A1* | 9/2014 | Matsumura | H04L 29/06047 |
| | | | 709/203 |
| 2015/0040187 A1* | 2/2015 | Fujii | H04L 63/08 |
| | | | 726/3 |
| 2015/0121492 A1* | 4/2015 | Cao | H04L 63/18 |
| | | | 726/6 |
| 2017/0019409 A1* | 1/2017 | Shalunov | H04L 12/6418 |

OTHER PUBLICATIONS

Dec. 4 2017 Office Action issued in Chinese Patent Application No. 201410743581.8.

* cited by examiner

FIG. 5

| MAIL ADDRESS | SERVICE | ACCESS TOKEN | AUTHORITY | 321 |
|---|---|---|---|---|
| a@example.com | Service 1 | Token 1A | FULL | |
| | | Token 1a | LIMITED | |
| | Service 2 | Token 2A | FULL | |
| | | Token 2a | LIMITED | |
| b@example.com | Service 1 | Token 1B | FULL | |
| | | Token 1b | LIMITED | |
| | Service 2 | Token 2B | FULL | |
| | | Token 2b | LIMITED | |
| ... | ... | ... | ... | |

FIG. 6

| APPARATUS ID | MAIL ADDRESS | REGISTRATION STATUS | 322 |
|---|---|---|---|
| ... | ... | ... | |
| ... | ... | ... | |

FIG. 7

| APPARATUS ID | MAIL ADDRESS | AUTHENTICATION STATUS | 323 |
|---|---|---|---|
| ... | ... | ... | |
| ... | ... | ... | |

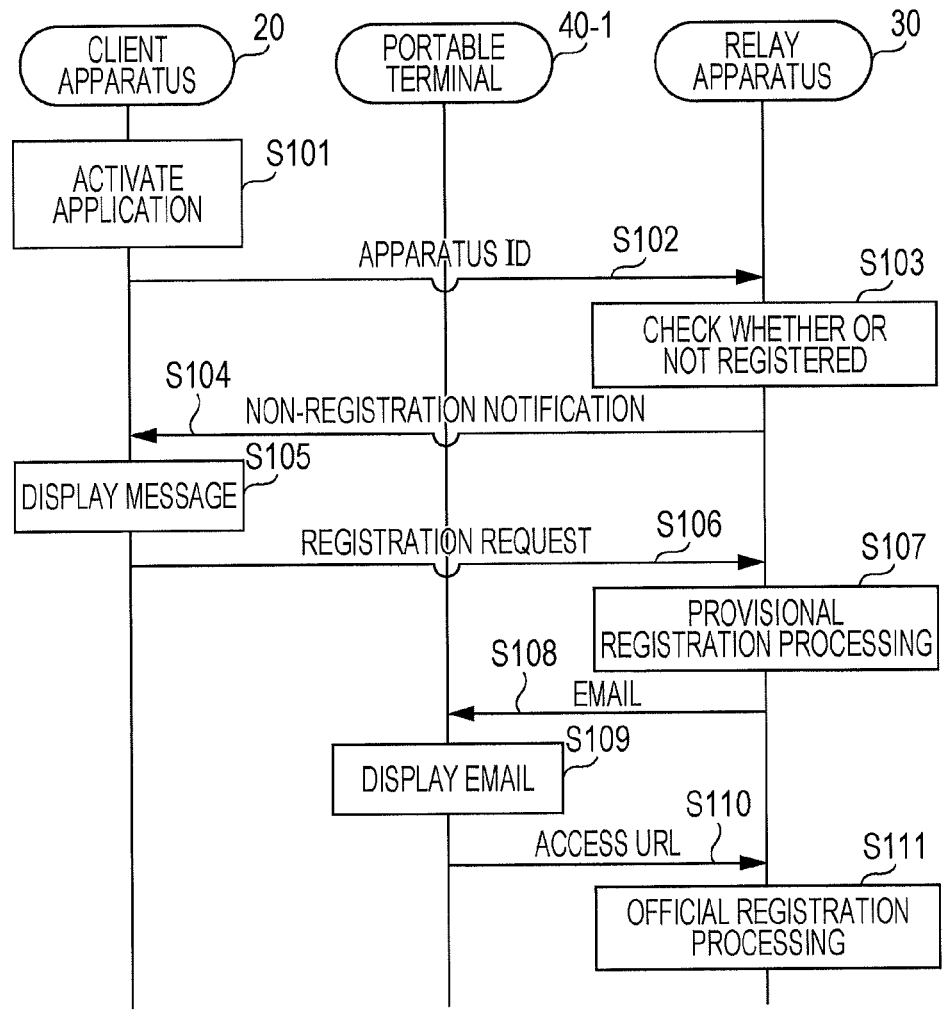

| APPARATUS ID | MAIL ADDRESS | REGISTRATION STATUS |
|---|---|---|
| XXX | a@example.com | REGISTRATION COMPLETED |
| ... | ... | ... |

FIG. 18

| APPARATUS ID | MAIL ADDRESS | AUTHENTICATION STATUS | 323 |
|---|---|---|---|
| XXX | a@example.com | AUTHENTICATION COMPLETED | |
| ... | ... | ... | |

FIG. 19

| APPARATUS ID | MAIL ADDRESS | AUTHENTICATION STATUS | 323 |
|---|---|---|---|
| XXX | a@example.com | AUTHENTICATION WITH LIMITATION COMPLETED | |
| ... | ... | ... | |

SUBJECT:

SENDER:

...

Please access the following URL
to complete your identification.

URL: ...      71

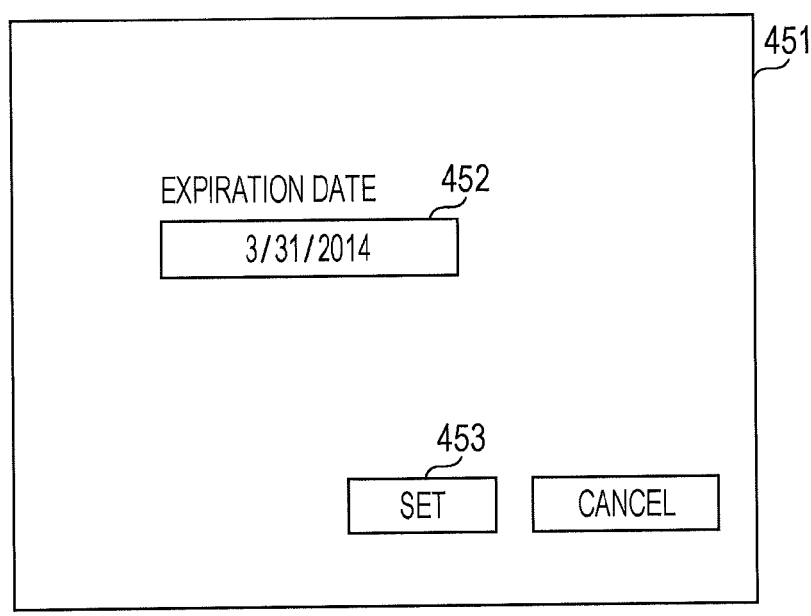

FIG. 24

| APPARATUS ID | MAIL ADDRESS | AUTHENTICATION STATUS | EXPIRATION DATE |
|---|---|---|---|
| XXX | a@example.com | AUTHENTICATION WITH LIMITATION COMPLETED | 3/31/2014 |
| ... | ... | ... | ... |

324

INFORMATION PROCESSING APPARATUS, COMMUNICATION SYSTEM, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2014-104257 filed May 20, 2014.

BACKGROUND (i) Technical Field

The present invention relates to an information processing apparatus, a communication system, a non-transitory computer readable medium, and an information processing method.

(ii) Related Art

A technique is available in which, in a case of using a server apparatus in a network, the server apparatus is accessed via a relay apparatus.

SUMMARY

According to an aspect of the invention, there is provided an information processing apparatus including a memory, a transmission unit, and a permission unit. The memory stores an identification of a client apparatus, a first mail address assigned to a first user, and first permission information indicating that the first user has authority to use a service, while associating the identification, the first mail address, and the first permission information with one another. The transmission unit transmits, in a case where the identification has been received from the client apparatus, a first email addressed to the first mail address stored in association with the identification that has been received. The permission unit permits, in a case where a reply corresponding to contents of the first email has been received from a terminal, use of the service in accordance with the first permission information stored in association with the first mail address.

BRIEF DESCRIPTION OF THE DRAWINGS

Exemplary embodiments of the present invention will be described in detail based on the following figures, wherein:

FIG. 5 is a diagram illustrating an example of a token management table;

FIG. 6 is a diagram illustrating an example of a registration table;

FIG. 7 is a diagram illustrating an example of an authentication table;

FIG. 9 is a sequence chart illustrating registration processing performed by the communication system;

FIG. 10 is a diagram illustrating an example of the registration table;

FIG. 18 is a diagram illustrating an example of the authentication table;

FIG. 19 is a diagram illustrating an example of the authentication table;

FIG. 20 is a diagram illustrating an example of an email;

FIG. 21 is a diagram illustrating an example of the authentication table;

FIG. 22 is a diagram illustrating an example of the authentication table;

FIG. 23 is a diagram illustrating an example of a setting screen according to a modification; and FIG. 24 is a diagram illustrating an example of an authentication table according to the modification.

DETAILED DESCRIPTION

1. Configuration (1) Overall Configuration of Communication System 1

Figure 1:
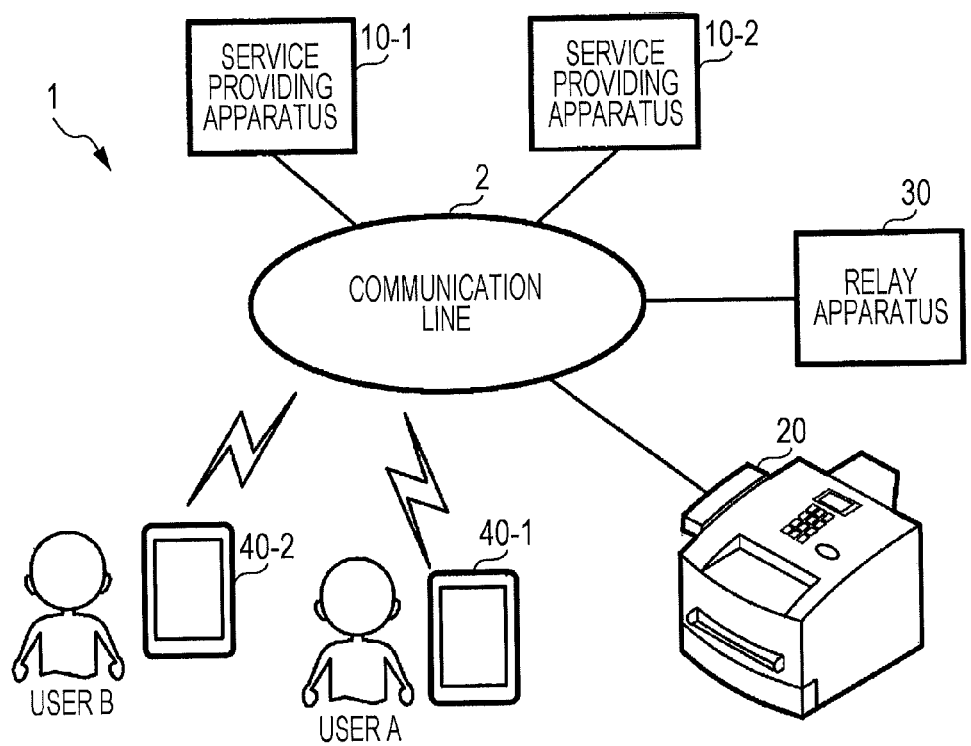
FIG. 1 is a diagram illustrating an overall configuration of a communication system.

FIG. 1 is a diagram illustrating an overall configuration of a communication system 1. The communication system 1 is a system for providing services to a user over a network, such as the Internet. The services include a cloud service, for example. The communication system 1 includes service providing apparatuses 10-1 and 10-2 (hereinafter referred to as a "service providing apparatus 10" in a case where the two apparatuses are not distinguished from each other), a client apparatus 20, a relay apparatus 30, and portable terminals 40-1 and 40-2 (hereinafter referred to as a "portable terminal 40" in a case where the two terminals are not distinguished from each other). The service providing apparatus 10, the client apparatus 20, the relay apparatus 30, and the portable terminal 40 are connected to one another via a communication line 2 including the Internet.

Note that only two service providing apparatuses 10 are illustrated in FIG. 1, however, three or more service providing apparatuses 10 may be provided. Similarly, only one client apparatus 20 is illustrated in FIG. 1, however, two or more client apparatuses 20 may be provided. Furthermore, only two portable terminals 40 are illustrated in FIG. 1, however, three or more portable terminals 40 may be provided.

The service providing apparatus 10 is an apparatus that provides services, such as data storage. The service providing apparatus 10 performs access control using an access token when providing services. The access token is permission information indicating that the user has authority to access and use the service providing apparatus 10. Specifically, the service providing apparatus 10 accepts access if the access is performed by using an access token that has been issued by the service providing apparatus 10. Otherwise, the service providing apparatus 10 rejects the access. The access token is not only authority information for permitting use of services provided by the service providing apparatus 10, but may also be used as authority information for permitting use of services provided by the relay apparatus 30.

The service providing apparatus 10 issues plural types of access tokens. For example, the service providing apparatus 10 issues an access token with full authority and an access token with limited authority. For these access tokens, operations that are permitted to be performed are set in advance. For example, for an access token with full authority, operations, that is, data storage, download, browsing, editing, and deletion are set. On the other hand, for an access token with limited authority, an operation of data browsing only is set. The service providing apparatus 10 provides services within the scope of authority given by the access token. Therefore, in a case where an access token with limited authority is used, services that are available from the service providing apparatus 10 are limited compared with a case where an access token with full authority is used.

(2) Hardware Configuration of Client Apparatus 20

Figure 2:
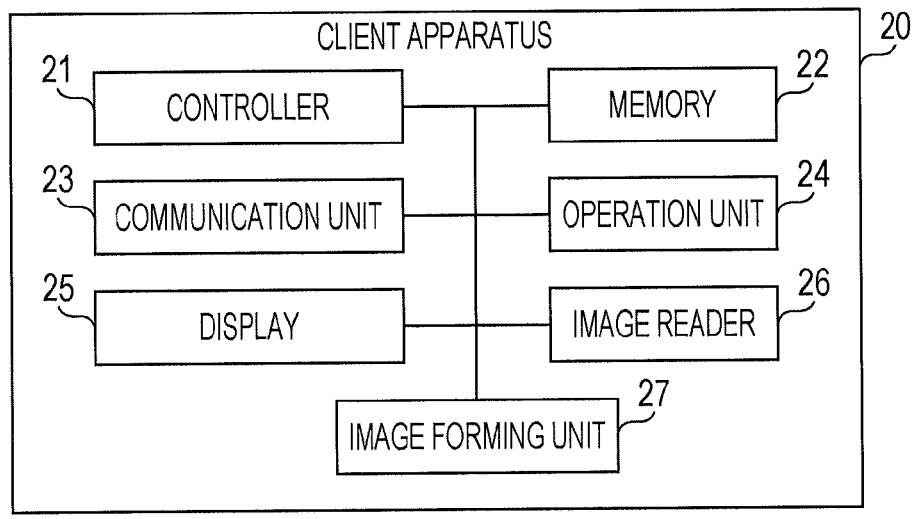
FIG. 2 is a diagram illustrating a hardware configuration of a client apparatus.

FIG. 2 is a diagram illustrating a hardware configuration of the client apparatus 20. The client apparatus 20 is an apparatus that receives services provided by the service providing apparatus 10. However, the client apparatus 20 accesses the service providing apparatus 10 via the relay apparatus 30 in a case of using the service providing apparatus 10. The client apparatus 20 is an image processing apparatus that has a copy function, a facsimile function, a print function, and a scan function, for example.

The client apparatus 20 includes a controller 21, a memory 22, a communication unit 23, an operation unit 24, a display 25, an image reader 26, and an image forming unit 27. These constituent elements are connected to one another via a bus. The controller 21 calculates data and controls the other constituent elements by executing a program stored in the memory 22. As the controller 21, a central processing unit (CPU) is used, for example. The memory 22 stores the program executed by the controller 21 and various types of data. The memory 22 includes a main memory and an auxiliary memory. As the main memory, a random access memory (RAM) is used, for example. As the auxiliary memory, a hard disk drive (HDD) is used, for example. In the memory 22, an application 221 (illustrated in FIG. 8) that provides a function of using the service providing apparatus 10 via the relay apparatus 30 is stored.

The communication unit 23 is a communication interface for performing data communication. The communication unit 23 performs data communication with the relay apparatus 30 via the communication line 2, for example. The communication unit 23 performs facsimile communication with an external apparatus having a facsimile function via a telephone line, which is not illustrated. The operation unit 24 inputs signals in accordance with operations performed by a user to the controller 21. As the operation unit 24, a touch panel and operation buttons are used, for example. The display 25 displays various types of information. As the display 25, a liquid crystal display is used, for example. The image reader 26 reads an image and converts the image into data. As the image reader 26, an image scanner is used, for example. The image forming unit 27 forms an image in accordance with input data. As the image forming unit 27, an electrophotographic printer is used, for example.

(3) Hardware Configuration of Portable Terminal 40

Figure 3:
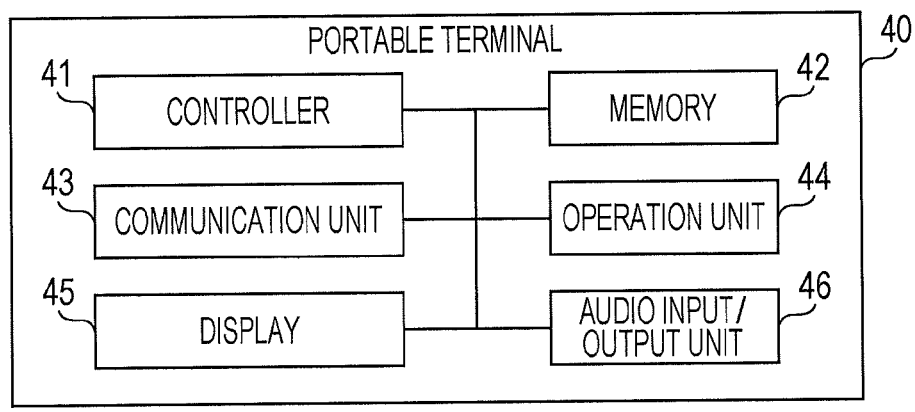
FIG. 3 is a diagram illustrating a hardware configuration of a portable terminal.

FIG. 3 is a diagram illustrating a hardware configuration of the portable terminal 40. The portable terminal 40 is an apparatus that is carried and used by each user. Here, it is assumed that the portable terminal 40-1 is mainly used by a user A and the portable terminal 40-2 is mainly used by a user B. The portable terminal 40 is a portable telephone, a smartphone, or a tablet terminal, for example. Other examples of the portable terminal 40 may include a wearable terminal of an eyeglass type, a headset type, or a watch type, for example.

Figure 8:
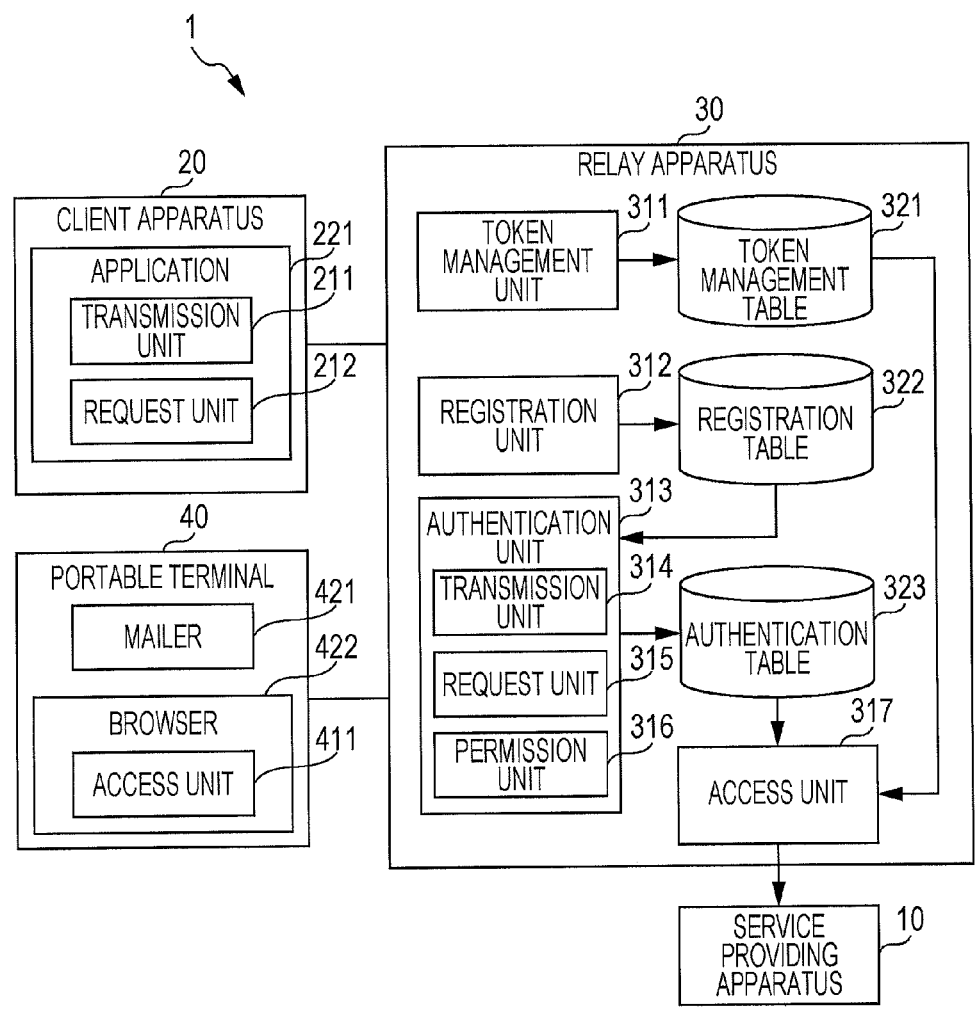
FIG. 8 is a diagram illustrating a functional configuration of the communication system.

The portable terminal 40 includes a controller 41, a memory 42, a communication unit 43, an operation unit 44, a display 45, and an audio input/output unit 46. These constituent elements are connected to one another via a bus. The controller 41 calculates data and controls the other constituent elements by executing a program stored in the memory 42. As the controller 41, a CPU is used, for example. The memory 42 stores the program executed by the controller 41 and various types of data. The memory 42 includes a main memory and an auxiliary memory. As the main memory, a RAM is used, for example. As the auxiliary memory, a flash memory is used, for example. In the memory 42, a mailer 421 that provides a function of transmitting, receiving, and managing emails and a browser 422 that provides a function of browsing web pages (both are illustrated in FIG. 8) are stored.

The communication unit 43 is a communication interface for performing data communication. The communication unit 43 performs data communication with the relay apparatus 30 via the communication line 2, for example. The operation unit 44 inputs signals in accordance with operations performed by a user to the controller 41. As the operation unit 44, a touch panel and operation buttons are used, for example. The display 45 displays various types of information. As the display 45, a liquid crystal display is used, for example. The audio input/output unit 46 performs audio input and output. As the audio input/output unit 46, a microphone and a speaker are used, for example.

(4) Hardware Configuration of Relay Apparatus 30

Figure 4:
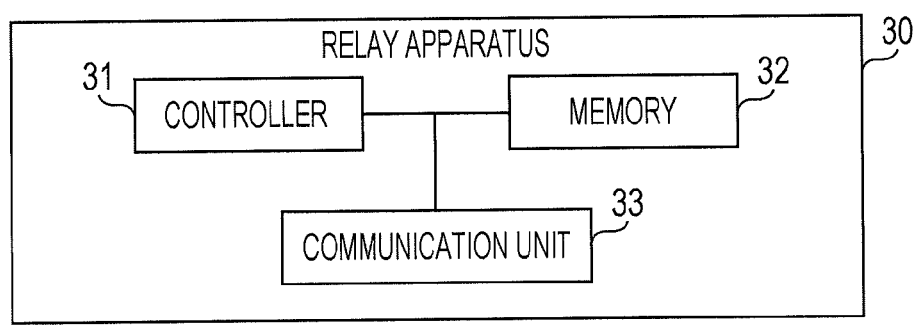
FIG. 4 is a diagram illustrating a hardware configuration of a relay apparatus.

FIG. 4 is a diagram illustrating a hardware configuration of the relay apparatus 30. The relay apparatus 30 is an information processing apparatus that relays data exchanged between the service providing apparatus 10 and the client apparatus 20. For example, in a case of storing data in the service providing apparatus 10, the relay apparatus 30 receives data transmitted from the client apparatus 20, and transfers the received data to any one of the service providing apparatuses 10 or plural service providing apparatuses 10. In a case of downloading data from the service providing apparatus 10, the relay apparatus 30 obtains data from any one of the service providing apparatuses 10, and transfers the obtained data to the client apparatus 20. The relay apparatus 30 may perform various types of processing on data received from the client apparatus 20 or the service providing apparatus 10, by using an external apparatus, before transferring the data. The processing may be character recognition processing called optical character recognition (OCR) or data format conversion processing, for example.

The relay apparatus 30 includes a controller 31, a memory 32, and a communication unit 33. These constituent elements are connected to one another via a bus. The controller 31 calculates data and controls the other constituent elements by executing a program stored in the memory 32. As the controller 31, a CPU is used, for example. The memory 32 stores the program executed by the controller 31 and various types of data. The memory 32 includes a main memory and an auxiliary memory. As the main memory, a RAM is used, for example. As the auxiliary memory, an HDD is used, for example. In the memory 32, a token management table 321, a registration table 322, and an authentication table 323 are stored. The communication unit 33 is a communication interface for performing data communication. The communication unit 33 performs data communication with the service providing apparatus 10, the client apparatus 20, or the portable terminal 40 via the communication line 2, for example.

FIG. 5 is a diagram illustrating an example of the token management table 321. The token management table 321 is used in management of access tokens issued by the service providing apparatus 10. Records that form the token management table 321 each include fields of "mail address", "service", "access token", and "authority". In the "mail address" field, a mail address assigned to a user is stored. In the "service" field, identification information about services provided by the service providing apparatus 10 is stored. The identification information is a service name, for example. A service "Service 1" is identification information about a service provided by the service providing apparatus 10-1, for example. A service "Service 2" is the name of a service provided by the service providing apparatus 10-2, for example. In the "access token" field, access tokens issued by the service providing apparatus 10 to the user are stored. In the "authority" field, information indicating authority given by the access token is stored.

For example, in a case where an access token "Token 1A" with broader authority (full authority) and an access token "Token 1a" with limited authority compared with "Token 1A" are issued to the user A from the service providing apparatus 10-1, and a mail address assigned to the user A is "a@example.com", the mail address "a@example.com", the service "Service 1", the access token "Token 1A" and its authority "full", and the access token "Token 1a" and its authority "limited" are associated with one another and stored in the token management table 321, as illustrated in FIG. 5.

FIG. 6 is a diagram illustrating an example of the registration table 322. The registration table 322 is used in management of information regarding registration of the client apparatus 20. Records that form the registration table 322 each include fields of "apparatus identification (ID)", "mail address", and "registration status". In the "apparatus ID" field, an apparatus ID that identifies the client apparatus 20 is stored. In the "mail address" field, a mail address of a user who uses the client apparatus 20, that is, a mail address assigned to the user is stored. In the "registration status" field, information indicating the registration status of the client apparatus 20 is stored.

FIG. 7 is a diagram illustrating an example of the authentication table 323. The authentication table 323 is used in management of information regarding permission or rejection of use of the service providing apparatus 10. Records that form the authentication table 323 each include fields of "apparatus ID", "mail address", and "authentication status". In the "apparatus ID" field, an apparatus ID that identifies the client apparatus 20 is stored. In the "mail address" field, a mail address of a user who uses the client apparatus 20, that is, a mail address assigned to the user is stored. In the "authentication status" field, information indicating permission or rejection of use of the service providing apparatus 10 communicated by the owner of the client apparatus 20 is stored.

(5) Functional Configuration of Communication System 1

FIG. 8 is a diagram illustrating a functional configuration of the communication system 1. The relay apparatus 30 has functions of a token management unit 311, a registration unit 312, an authentication unit 313, a transmission unit 314 (first transmission unit), a request unit 315, a permission unit 316, and an access unit 317 (first access unit). These functions are implemented by the controller 31 executing one or plural programs. These functions may be implemented by the controller 31 in cooperation with the other constituent elements.

The token management unit 311 manages access tokens issued by the service providing apparatus 10, by using the token management table 321. The registration unit 312 performs processing of registering the client apparatus 20 by using the registration table 322. The authentication unit 313 performs processing of controlling use of the service providing apparatus 10 from the client apparatus 20, on the basis of authentication performed by the owner of the client apparatus 20.

When receiving an apparatus ID (an example of an identification) from the client apparatus 20, the transmission unit 314 transmits an email addressed to a mail address stored in the registration table 322 in association with the apparatus ID. The transmission unit 314 transmits an email addressed to the mail address, the email containing plural options regarding permission or rejection of use of the service providing apparatus 10. In a case where an option of permitting use of functions of the service providing apparatus 10 by using an access token of a user other than the owner of the client apparatus 20 is selected by the portable terminal 40 from among the plural options, the request unit 315 requests the client apparatus 20 to input a mail address. In this case, when receiving a mail address from the client apparatus 20, the transmission unit 314 further transmits an email addressed to the mail address.

In a case of receiving access from the portable terminal 40 in accordance with the contents of the email, the permission unit 316 permits use of an access token stored in the token management table 321 in association with the mail address. In a case where use of an access token has been permitted, the access unit 317 accesses the service providing apparatus 10 by using the access token, in response to a request from the client apparatus 20.

The client apparatus 20 has functions of a transmission unit 211 and a request unit 212. These functions are implemented by the controller 21 executing the application 221. These functions may be implemented by the controller 21 in cooperation with the other constituent elements. The transmission unit 211 transmits the apparatus ID of the client apparatus 20 to the relay apparatus 30. The request unit 212 requests the relay apparatus 30 to access the service providing apparatus 10. Note that description may be given below while assuming that the application 221 is a subject that performs processing, which means that the controller 21 that executes the application 221 performs the processing.

The portable terminal 40 has a function of an access unit 411 (second access unit). This function is implemented by the controller 41 executing the browser 422. The function may be implemented by the controller 41 in cooperation with the other constituent elements. In a case where operations for permitting use of the service providing apparatus 10 have been performed using the operation unit 44 in accordance with the contents of the email from the relay apparatus 30, the access unit 411 accesses the relay apparatus 30. Note that description may be given below while assuming that the mailer 421 or the browser 422 is a subject that performs processing, which means that the controller 41 that executes the mailer 421 or the browser 422 performs the processing.

2. Operations (1) Registration Processing

FIG. 9 is a sequence chart illustrating registration processing performed by the communication system 1. Before using the relay apparatus 30 from the client apparatus 20, the client apparatus 20 needs to be registered in the relay apparatus 30 in advance. Registration processing is performed in order to register the client apparatus 20 in the relay apparatus 30. Here, it is assumed that registration processing is performed by the user A (an example of the first user), who is the owner of the client apparatus 20. The registration processing is started when the user A performs operations for activating the application 221 using the operation unit 24, for example.

In step S101, the controller 21 activates the application 221.

In step S102, the application 221 transmits a registration check request for checking registration of the client apparatus 20 to the relay apparatus 30. This registration check request contains the apparatus ID of the client apparatus 20. When the relay apparatus 30 receives the registration check request from the client apparatus 20, the processing proceeds to step S103. The apparatus ID contained in the registration check request is stored in the memory 32.

In step S103, the registration unit 312 checks whether or not the client apparatus 20 has been registered on the basis of the apparatus ID contained in the registration check request that has been received. For example, in a case where the apparatus ID is "XXX", it is determined whether or not the apparatus ID "XXX" has been stored in the registration table 322. If the apparatus ID "XXX" has been stored in the registration table 322, this means that the client apparatus 20 has been registered in the relay apparatus 30. In this case, the registration processing ends. On the other hand, if the apparatus ID "XXX" has not been stored in the registration table 322, this means that the client apparatus 20 has not been registered in the relay apparatus 30. In this case, the processing proceeds to step S104 in the relay apparatus 30.

In step S104, the registration unit 312 transmits a non-registration notification indicating that the client apparatus 20 has not been registered to the client apparatus 20. When the client apparatus 20 receives the non-registration notification from the relay apparatus 30, the processing proceeds to step S105.

In step S105, the application 221 displays a message that requests input of a mail address, on the display 25. The user A performs operations for inputting "a@example.com", which is the mail address of the user A, using the operation unit 24 in response to the message displayed on the display 25.

In step S106, the application 221 transmits a registration request for registering the client apparatus 20, to the relay apparatus 30. This registration request contains the apparatus ID of the client apparatus 20 and the mail address that has been input. When the relay apparatus 30 receives the registration request from the client apparatus 20, the processing proceeds to step S107. The apparatus ID and the mail address contained in the registration request are stored in the memory 32.

In step S107, the registration unit 312 performs provisional registration processing. Specifically, in a case where the apparatus ID received in step S106 is "XXX" and the mail address received in step S106 is "a@example.com", for example, the registration unit 312 stores the apparatus ID "XXX", the mail address "a@example.com", and a registration status "checking" in a new record of the registration table 322, as illustrated in FIG. 10. The registration status "checking" indicates a state where identification is in progress.

In step S108, the registration unit 312 transmits an email 50 for registration check addressed to the mail address received in step S106. For example, in a case where the mail address received in step S106 is "a@example.com", the email 50 is addressed to this mail address and transmitted. The user A receives and reads the email 50 using the terminal 40-1.

Figures 11, 12:
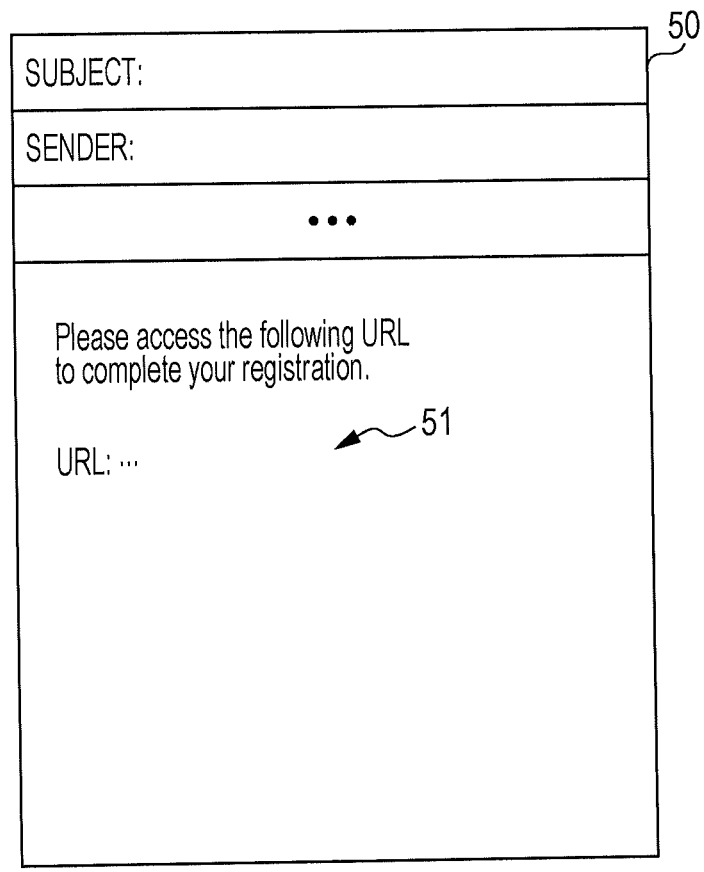
FIG. 11 is a diagram illustrating an example of an email.
FIG. 12 is a diagram illustrating an example of the registration table.
Figure 13:
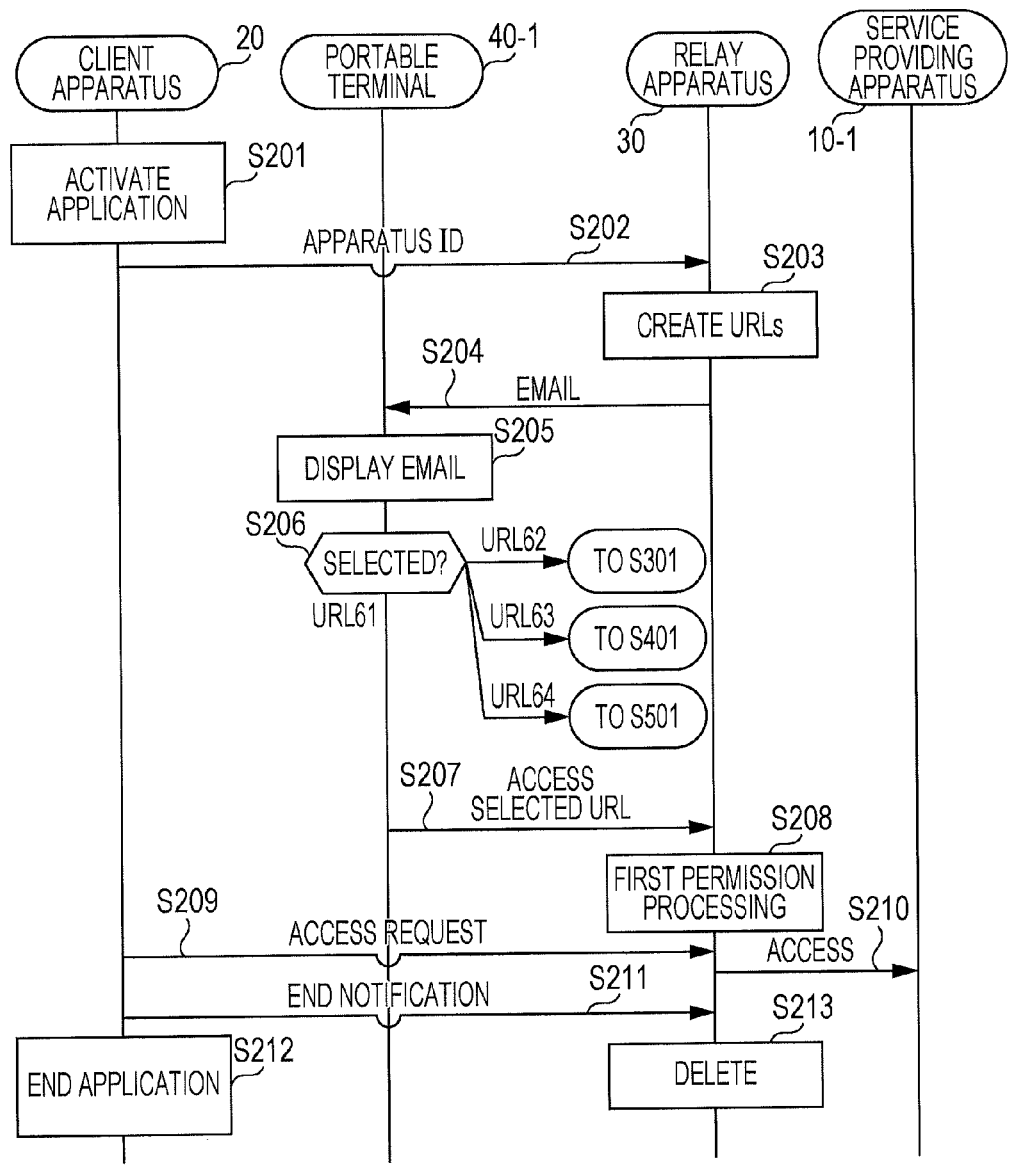
FIG. 13 is a sequence chart illustrating use processing performed by the communication system.
Figure 14:
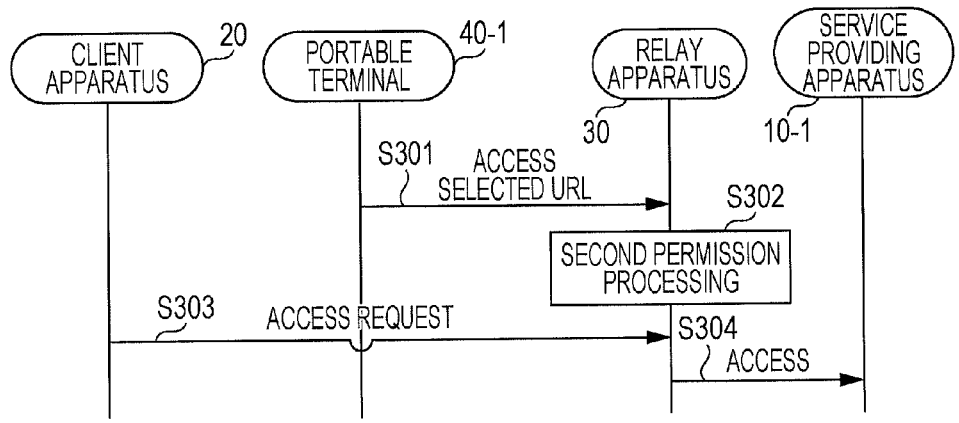
FIG. 14 is a sequence chart illustrating use processing performed by the communication system.
Figure 15:
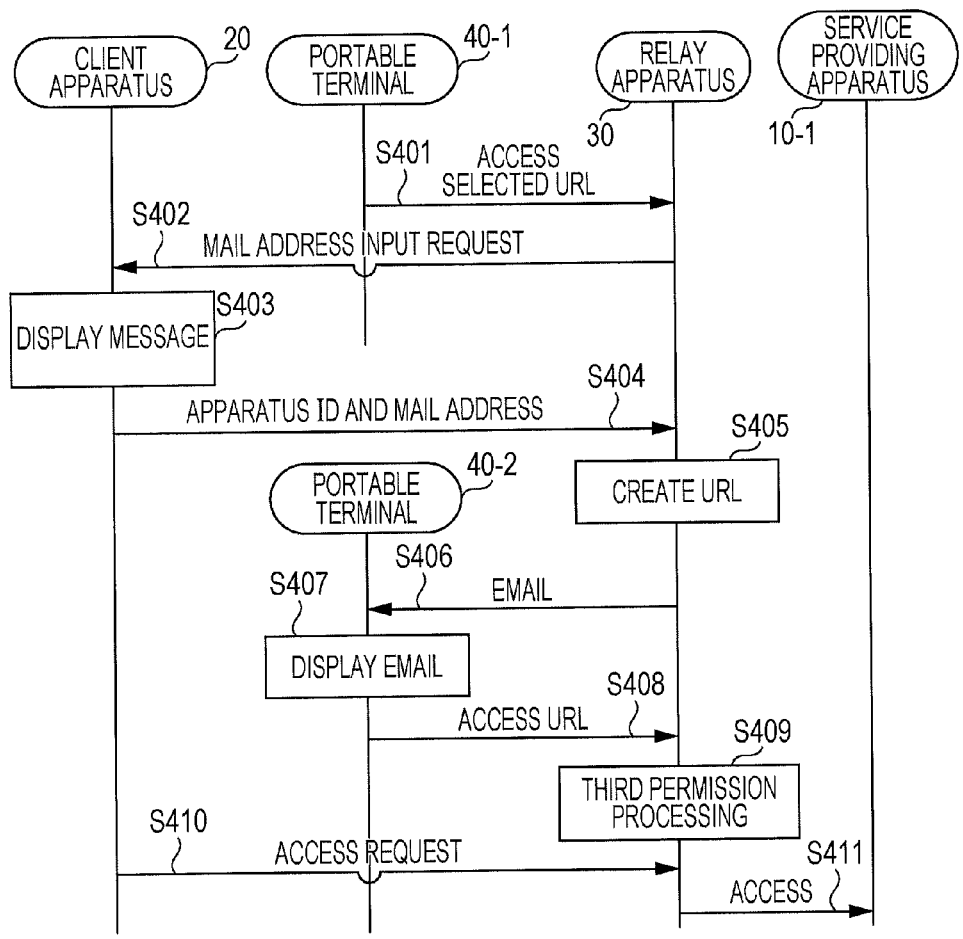
FIG. 15 is a sequence chart illustrating use processing performed by the communication system.
Figure 16:
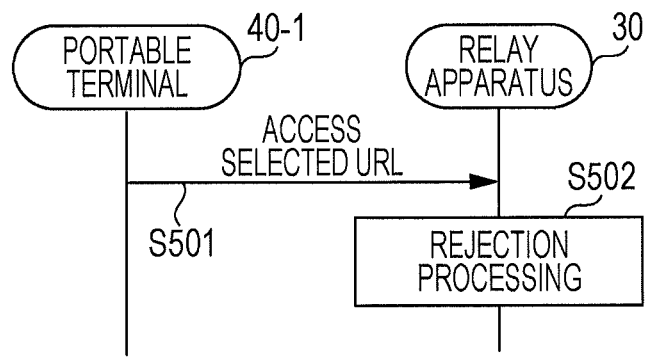
FIG. 16 is a sequence chart illustrating use processing performed by the communication system.

FIG. 11 is a diagram illustrating an example of the email 50. In the body of the email 50, a uniform resource locator (URL) 51 for registration check is included. The URL 51 is generated as information that indicates a location in the relay apparatus 30 in accordance with the corresponding process. When the portable terminal 40-1 receives the email 50 from the relay apparatus 30, the processing proceeds to step S109.

In step S109, the mailer 421 displays the email 50 that has been received on the display 45. The user A is a user who is performing registration processing, and therefore, the user A performs operations for selecting the URL 51 included in the body of the email 50, by using the operation unit 44.

In step S110, the access unit 411 accesses the location indicated by the URL 51 that has been selected as a reply to the contents written in the transmitted email. When the relay apparatus 30 is accessed by the terminal 40-1 at the location indicated by the URL 51, the processing proceeds to step S111.

In step S111, the registration unit 312 performs official registration processing. Specifically, the registration unit 312 changes the registration status stored in the registration table 322 in the provisional registration processing performed in step S107 from "checking" to "registration completed", as illustrated in FIG. 12. The registration status "registration completed" indicates that registration of the client apparatus 20 has been completed. As a result, the client apparatus 20 is able to use the relay apparatus 30.

(2) Use Processing

FIGS. 13 to 16 are sequence charts illustrating use processing performed by the communication system 1. The use processing is performed when a user uses the service providing apparatus 10 from the client apparatus 20. The user may be the owner of the client apparatus 20 or a user other than the owner. The use processing is started when a user performs operations for activating the application 221 using the operation unit 24, for example.

In step S201, the controller 21 activates the application 221.

In step S202, the transmission unit 211 transmits to the relay apparatus 30 a use check request for checking with the owner of the client apparatus 20. The use check request contains the apparatus ID of the client apparatus 20. When the relay apparatus 30 receives the use check request from the client apparatus 20, the processing proceeds to step S203. The apparatus ID contained in the use check request is stored in the memory 32.

In step S203, the authentication unit 313 creates URLs 61 to 64 for use check. The URLs 61 to 64 are generated as pieces of information that indicate different locations in the relay apparatus 30. The URLs 61 to 64 are used in a case of selecting the first to fourth options regarding permission or rejection of use of the service providing apparatus 10. Specifically, the URL 61 is used in a case of selecting the first option of permitting use of all predetermined functions of the service providing apparatus 10 using an access token of the owner of the client apparatus 20. The URL 62 is used in a case of selecting the second option of permitting use of the service providing apparatus 10 using an access token of the owner of the client apparatus 20 but limiting functions that may be used by the user. The URL 63 is used in a case of selecting the third option of permitting use of the service providing apparatus 10 using an access token of a user other than the owner of the client apparatus 20. The URL 64 is used in a case of selecting the fourth option of rejecting use of the service providing apparatus 10 from the client apparatus 20. The locations indicated by the URLs 61 to 64 are different from the location indicated by the URL 51.

In step S204, the transmission unit 314 transmits an email 60 (an example of the first email) for use check addressed to the mail address of the owner of the client apparatus 20. Specifically, in a case where the apparatus ID received in step S202 is "XXX", for example, the transmission unit 314 performs processing as described below. First, the transmission unit 314 specifies the mail address "a@example.com" (an example of the first mail address) stored in association with the apparatus ID "XXX", using the registration table 322 illustrated in FIG. 12. Next, the transmission unit 314 transmits the email 60 addressed to the mail address "a@example.com" that has been specified. The user A, who is the owner of the client apparatus 20, receives and reads the email 60 using the portable terminal 40-1.

Figure 17:
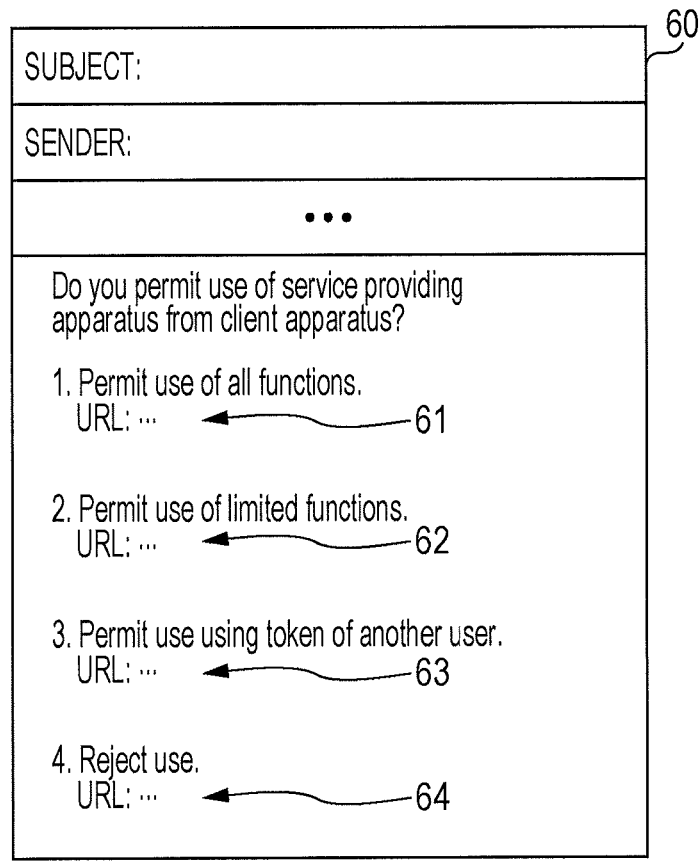
FIG. 17 is a diagram illustrating an example of an email.

FIG. 17 is a diagram illustrating an example of the email 60. In the body of the email 60, the URLs 61 to 64 created in step S203 are included together with the first to fourth options. When the portable terminal 40-1 receives the email 60 from the relay apparatus 30, the processing proceeds to step S205.

In step S205, the mailer 421 displays the email 60 that has been received, on the display 45.

(2-1) Case of Permitting Use of all Functions

In the case of selecting the first option from among the first to fourth options included in the email 60, the user A performs operations for selecting the URL 61 (an example of operations for permitting use) using the operation unit 44. For example, the user A selects the first option in a case where the user A uses the client apparatus 20 by himself/herself or in a case where the user A lends another user the client apparatus 20 and wishes to allow the other user to use functions of the service providing apparatus 10 without limitation.

In step S206, the access unit 411 determines which of the URLs 61 to 64 included in the email 60 has been selected. As described above, in a case where the URL 61 has been selected, the processing proceeds to step S207 in the portable terminal 40-1.

In step S207, the access unit 411 accesses the location indicated by the URL 61 that has been selected. When the relay apparatus 30 is accessed from the portable terminal 40-1 at the location indicated by the URL 61, the relay apparatus 30 determines that the first option has been selected, and the processing proceeds to step S208.

In step S208, the permission unit 316 performs the first permission processing. Specifically, in the case where the apparatus ID received in step S202 is "XXX", for example, the permission unit 316 performs processing as described below. First, the permission unit 316 reads the mail address "a@example.com" stored in association with the apparatus ID "XXX", from the registration table 322 illustrated in FIG. 12. Next, the permission unit 316 stores the apparatus ID "XXX", the mail address "a@example.com", and an authentication status "authentication completed" in a new record of the authentication table 323, as illustrated in FIG. 18. The authentication status "authentication completed" indicates a state where use of all predetermined functions of the service providing apparatus 10 using an access token has been permitted. As a result, use of a user A's access token with full authority is permitted in a case of using the service providing apparatus 10 from the client apparatus 20.

Here, it is assumed that the user A uses the service providing apparatus 10-1 by using the client apparatus 20. In this case, the user A performs operations for selecting the service providing apparatus 10-1 as an access destination using the operation unit 24.

In step S209, the request unit 212 transmits to the relay apparatus 30 an access request for accessing the service providing apparatus 10-1. The access request contains the apparatus ID of the client apparatus 20 and identification information about services of the service providing apparatus 10-1 that has been selected. When the relay apparatus 30 receives the access request from the client apparatus 20, the processing proceeds to step S210. The apparatus ID and the identification information about services contained in the access request are stored in the memory 32.

In step S210, the access unit 317 accesses the service providing apparatus 10-1 using the user A's access token with full authority. Specifically, in a case where the apparatus ID received in step S209 is "XXX" and the identification information about services received in step S209 is "Service 1", for example, the access unit 317 performs processing as described below. First, the access unit 317 specifies the mail address "a@example.com" that has been stored in association with the apparatus ID "XXX" and the authentication status "authentication completed", using the authentication table 323 illustrated in FIG. 18. Next, the access unit 317 reads an access token "Token 1A" (an example of the first access token) that has been stored in association with the specified mail address "a@example.com", the service "Service 1", and the authority "full", from the token management table 321 illustrated in FIG. 5. The access unit 317 thereafter accesses the service providing apparatus 10-1 using the access token.

When the service providing apparatus 10-1 is accessed from the relay apparatus 30 using the access token "Token 1A", the service providing apparatus 10-1 accepts the access because the access token is an access token issued by the service providing apparatus 10-1.

When the access is accepted by the service providing apparatus 10-1, the access unit 317 of the relay apparatus 30 performs operations requested by the client apparatus 20. The access token "Token 1A" is an access token with full authority, and therefore, any operation requested by the client apparatus 20 is performed. For example, in a case where data that represents an image read by the image reader 26 is transmitted by the client apparatus 20 and operations for storing the data in the service providing apparatus 10-1 are requested, the access unit 317 transmits the data received from the client apparatus 20 to the service providing apparatus 10-1 to make the service providing apparatus 10-1 store the data. In a case where operations for downloading data stored in the service providing apparatus 10-1 are requested by the client apparatus 20, the access unit 317 obtains the target data from the service providing apparatus 10-1 and transmits the data to the client apparatus 20. In this case, the client apparatus 20 may form an image in accordance with the data received from the relay apparatus 30, by using the image forming unit 27, for example.

When use of the service providing apparatus 10-1 ends, the user A performs operations for giving an instruction for ending the application 221, by using the operation unit 24 of the client apparatus 20.

In step S211, the application 221 transmits to the relay apparatus 30 an end notification indicating that use of the service providing apparatus 10 has ended. The end notification contains the apparatus ID of the client apparatus 20.

In step S212, the controller 21 ends the application 221. On the other hand, when the relay apparatus 30 receives the end notification from the client apparatus 20, the processing proceeds to step S213. The apparatus ID contained in the end notification is stored in the memory 32.

In step S213, the authentication unit 313 deletes a record that contains the apparatus ID contained in the end notification from the authentication table 323. For example, in a case where the apparatus ID contained in the end notification is "XXX", a record that contains the apparatus ID "XXX" is deleted from the authentication table 323 illustrated in FIG. 18. As a result, even if an access request is transmitted from the client apparatus 20 after processing in step S213, use of an access token is not permitted because the apparatus ID "XXX" of the client apparatus 20 is not stored in the authentication table 323. Accordingly, use of the service providing apparatus 10 from the client apparatus 20 is not possible any more. That is, the client apparatus 20 is able to use the service providing apparatus 10 only during a period where the apparatus ID is stored in the authentication table 323. In order to use the service providing apparatus 10 from the client apparatus 20 after processing in step S213, the processing in steps S201 to S208 described above needs to be performed again.

(2-2) Case of Permitting Use while Limiting Functions

In step S205 described above, in the case of selecting the second option from among the first to fourth options included in the email 60, the user A performs operations for selecting the URL 62 (an example of operations for permitting use) using the operation unit 44. For example, the user A selects the second option in a case where the user A lends another user the client apparatus 20 and wishes to limit functions of the service providing apparatus 10 that are made available to the other user. In this case, it is determined in step S206 described above that the URL 62 has been selected, and therefore, the processing proceeds to step S301 illustrated in FIG. 14, in the portable terminal 40-1.

In step S301, the access unit 411 accesses the location indicated by the URL 62 that has been selected. When the relay apparatus 30 is accessed from the portable terminal 40-1 at the location indicated by the URL 62, the relay apparatus 30 determines that the second option has been selected, and the processing proceeds to step S302.

In step S302, the permission unit 316 performs the second permission processing. Specifically, in the case where the apparatus ID received in step S202 is "XXX", for example, the permission unit 316 performs processing as described below. First, the permission unit 316 reads the mail address "a@example.com" stored in association with the apparatus ID "XXX", from the registration table 322 illustrated in FIG. 12. Next, the permission unit 316 stores the apparatus ID "XXX", the mail address "a@example.com", and an authentication status "authentication with limitation completed" in a new record of the authentication table 323, as illustrated in FIG. 19. The authentication status "authentication with limitation completed" indicates a state where use of some of the predetermined functions of the service providing apparatus 10 using an access token has been permitted. As a result, use of a user A's access token with limited authority is permitted in the case of using the service providing apparatus 10 from the client apparatus 20.

Here, it is assumed that the user A lends the user B the client apparatus 20, and the user B uses the service providing apparatus 10-1 from the client apparatus 20. In this case, the user B performs operations for selecting the service providing apparatus 10-1 as an access destination, using the operation unit 24.

In step S303, the request unit 212 transmits to the relay apparatus 30 an access request for accessing the service providing apparatus 10-1 similarly to step S209 described above. When the relay apparatus 30 receives the access request from the client apparatus 20, the processing proceeds to step S304. The apparatus ID and the identification information about services contained in the access request are stored in the memory 32.

In step S304, the access unit 317 accesses the service providing apparatus 10-1 using the user A's access token with limited authority. Specifically, in a case where the apparatus ID received in step S303 is "XXX" and the identification information about services received in step S303 is "Service 1", for example, the access unit 317 performs processing as described below. First, the access unit 317 specifies the mail address "a@example.com" that has been stored in association with the apparatus ID "XXX" and the authentication status "authentication with limitation completed", using the authentication table 323 illustrated in FIG. 19. Next, the access unit 317 reads an access token "Token 1a" (an example of the second access token) that has been stored in association with the mail address "a@example.com", the service "Service 1", and the authority "limited", from the token management table 321 illustrated in FIG. 5. The access unit 317 thereafter accesses the service providing apparatus 10-1 using the access token "Token 1a".

When the service providing apparatus 10-1 is accessed from the relay apparatus 30 using the access token "Token 1a", the service providing apparatus 10-1 accepts the access because the access token is an access token issued by the service providing apparatus 10-1.

When the access is accepted by the service providing apparatus 10-1, the access unit 317 of the relay apparatus 30 performs operations requested by the client apparatus 20. However, the service providing apparatus 10-1 provides services within the scope of authority given by the access token "Token 1a". For example, in a case where operations set for the access token "Token 1a" include data browsing only, when data browsing is requested, the service providing apparatus 10-1 performs processing in response to the request, however, when an operation other than data browsing is requested, the service providing apparatus 10-1 rejects the request.

Processing performed thereafter is similar to the processing in steps S211 to S213 described above, and therefore, description thereof will be omitted.

(2-3) Case of Permitting Use Using Access Token of Another User

In step S205 described above, in the case of selecting the third option from among the first to fourth options included in the email 60, the user A performs operations for selecting the URL 63 (an example of operations for permitting use) using the operation unit 44. For example, the user A selects the third option in a case where the user A lends another user the client apparatus 20 but does not wish to allow the other user to use the access token of the user A. In this case, it is determined in step S206 described above that the URL 63 has been selected, and therefore, the processing proceeds to step S401 illustrated in FIG. 15, in the portable terminal 40-1.

In step S401, the access unit 411 accesses the location indicated by the URL 63 that has been selected. When the relay apparatus 30 is accessed from the portable terminal 40-1 at the location indicated by the URL 63, the relay apparatus 30 determines that the third option has been selected, and the processing proceeds to step S402.

In step S402, the request unit 315 transmits an input request for inputting a mail address, to the client apparatus 20. When the client apparatus 20 receives the input request from the relay apparatus 30, the processing proceeds to step S403.

In step S403, the application 221 displays on the display 25 a message that requests input of a mail address. Here, it is assumed that the user A lends the user B (an example of the second user) the client apparatus 20, and the user B uses the client apparatus 20. In this case, the user B performs operations for inputting a mail address "b@example.com" (an example of the second mail address) that has been assigned to the user B, using the operation unit 24.

In step S404, the application 221 transmits the apparatus ID and the mail address that has been input to the relay apparatus 30. When the relay apparatus 30 receives the apparatus ID and the mail address from the client apparatus 20, the processing proceeds to step S405. The apparatus ID and the mail address are stored in the memory 32.

In step S405, the authentication unit 313 creates a URL 71 for identification. The URL 71 is generated as information that indicates a location in the relay apparatus 30 in accordance with the corresponding process. Note that the location indicated by the URL 71 is different from any of the location indicated by the URL 51 and the locations indicated by the URLs 61 to 64.

In step S406, the transmission unit 314 transmits an email 70 for identification addressed to the mail address received from the client apparatus 20. For example, in a case where the mail address received in step S404 is "b@example.com", the email 70 is addressed to the mail address and transmitted. The user B receives and reads the email 70 using the portable terminal 40-2.

FIG. 20 is a diagram illustrating an example of the email 70. In the body of the email 70, the URL 71 created in step S405 is included. When the portable terminal 40-2 receives the email 70 from the relay apparatus 30, the processing proceeds to step S407.

In step S407, the mailer 421 displays on the display 45 the email 70 that has been received. The user B is a user who uses the client apparatus 20, and therefore, the user B performs operations for selecting the URL 71 included in the body of the email 70, using the operation unit 44.

In step S408, the access unit 411 accesses the location indicated by the URL 71 that has been selected. When the relay apparatus 30 is accessed from the portable terminal 40-2 at the location indicated by the URL 71, the processing proceeds to step S409.

In step S409, the permission unit 316 performs the third permission processing. Specifically, in a case where the apparatus ID received in step S404 is "XXX" and the mail address received in step S404 is "b@example.com", for example, the permission unit 316 performs processing as described below. First, the permission unit 316 reads the mail address "a@example.com" stored in association with the apparatus ID "XXX", from the registration table 322 illustrated in FIG. 12. Next, the permission unit 316 stores the apparatus ID "XXX", the mail address "a@example.com", and an authentication status "transferred" in a new record of the authentication table 323, as illustrated in FIG. 21. The authentication status "transferred" indicates a state where use of the service providing apparatus 10 using an access token of a user other than the owner has been permitted. Furthermore, the permission unit 316 stores the apparatus ID "XXX", the mail address "b@example.com", and the authentication status "authentication completed" in a new record of the authentication table 323. As a result, use of a user B's access token with full authority is permitted in the case of using the service providing apparatus 10 from the client apparatus 20.

Here, it is assumed that the user A lends the user B the client apparatus 20, and the user B uses the service providing apparatus 10-1 from the client apparatus 20. In this case, the user B performs operations for selecting the service providing apparatus 10-1 as an access destination, using the operation unit 24.

In step S410, the request unit 212 transmits to the relay apparatus 30 an access request for accessing the service providing apparatus 10-1 similarly to step S209 described above. When the relay apparatus 30 receives the access request from the client apparatus 20, the processing proceeds to step S411. The apparatus ID and the identification information about services contained in the access request are stored in the memory 32.

In step S411, the access unit 317 accesses the service providing apparatus 10-1 using the user B's access token with full authority. Specifically, in a case where the apparatus ID received in step S410 is "XXX" and the identification information about services received in step S410 is "Service 1", for example, the access unit 317 performs processing as described below. First, the access unit 317 specifies the mail address "b@example.com" that has been stored in association with the apparatus ID "XXX" and the authentication status "authentication completed", using the authentication table 323 illustrated in FIG. 21. Next, the access unit 317 reads an access token "Token 1B" (an example of the third access token) that has been stored in association with the mail address "b@example.com", the service "Service 1", and the authority "full", from the token management table 321 illustrated in FIG. 5. The access unit 317 thereafter accesses the service providing apparatus 10-1 using the access token.

When the service providing apparatus 10-1 is accessed from the relay apparatus 30 using the access token "Token 1B", the service providing apparatus 10-1 accepts the access because the access token is an access token issued by the service providing apparatus 10-1.

When the access is accepted by the service providing apparatus 10-1, the access unit 317 of the relay apparatus 30 performs operations requested by the client apparatus 20. The access token "Token 1B" is an access token with full authority, and therefore, any operation requested by the client apparatus 20 is performed.

Processing performed thereafter is similar to the processing in steps S211 to S213 described above, and therefore, description thereof will be omitted.

(2-4) Case of Rejecting Use

In step S205 described above, in the case of selecting the fourth option from among the first to fourth options included in the email 60, the user A performs operations for selecting the URL 64 using the operation unit 44. For example, the user A selects the fourth option in a case where another user is using the client apparatus 20 without permission. In this case, it is determined in step S206 described above that the URL 64 has been selected, and therefore, the processing proceeds to step S501 illustrated in FIG. 16, in the portable terminal 40-1.

In step S501, the access unit 411 accesses the location indicated by the URL 64 that has been selected. When the relay apparatus 30 is accessed from the portable terminal 40-1 at the location indicated by the URL 64, the relay apparatus 30 determines that the fourth option has been selected, and the processing proceeds to step S502.

In step S502, the permission unit 316 performs rejection processing. Specifically, in the case where the apparatus ID received in step S202 is "XXX", for example, the permission unit 316 performs processing as described below. First, the permission unit 316 reads the mail address "a@example.com" stored in association with the apparatus ID "XXX", from the registration table 322 illustrated in FIG. 12. Next, the permission unit 316 stores the apparatus ID "XXX", the mail address "a@example.com", and an authentication status "rejected" in a new record of the authentication table 323, as illustrated in FIG. 22. The authentication status "rejected" indicates a state where use of the service providing apparatus 10 has been rejected. As a result, even if an access request is transmitted from the client apparatus 20, the access request is rejected.

According to the exemplary embodiment described above, in the case of using the service providing apparatus 10 from the client apparatus 20, the email 60 is transmitted to the owner of the client apparatus 20, and use check is performed. In a case where the owner performs operations for selecting any of the URLs 61 to 63 included in the email 60, use of the service providing apparatus 10 is permitted. On the other hand, in a case where the owner performs operations for selecting the URL 64 included in the email 60, use of the service providing apparatus 10 is rejected. As described above, use of the service providing apparatus 10 from the client apparatus 20 is not allowed without permission of a specific user, such as the owner, to thereby suppress use of the service providing apparatus 10 from the client apparatus 20 without permission of a specific user.

In the related art, in a case of lending another user other than the owner of the client apparatus 20, the other user has to access the service providing apparatus 10 using an access token of the owner, or has to input authentication information about himself/herself to the client apparatus 20 and access the service providing apparatus 10 using his/her own access token. In the former case, the owner might not wish to allow the other user to use all predetermined functions of the service providing apparatus 10, for example. In the latter case, the other user has to input authentication information about himself/herself to the client apparatus 20 owned by a person other than the other user, which the other user may hesitate to do.

According to the exemplary embodiment described above, however, services that are provided by the service providing apparatus 10 and that may be used from the client apparatus 20 are easily limited by the owner only performing operations for selecting the URL 62 included in the email 60. In this case, the owner does not have to perform in advance operations for setting transfer of authority, for example. Access to the service providing apparatus 10 using an access token of another user is permitted by the owner performing operations for selecting the URL 63 included in the email 60. In this case, the other user does not have to input authentication information to the client apparatus 20. Accordingly, the client apparatus 20 is lent by the owner to another user with security.

Furthermore, use of the service providing apparatus 10 from the client apparatus 20 is rejected by the owner performing operations for selecting the URL 64 included in the email 60. Accordingly, use of the service providing apparatus 10 from the client apparatus 20 without permission of the owner is suppressed.

According to the exemplary embodiment described above, identification is performed using an email, and therefore, login to the relay apparatus 30 is not needed in the case of using services provided by the service providing apparatus 10 from the client apparatus 20. Therefore, troublesome login is omitted, and convenience is improved. Moreover, personal information, such as a user ID and a password, which are needed for login to the client apparatus 20 or the relay apparatus 30 is not retained, and therefore, a risk of leakage of personal information to a third party is reduced. An access token is not retained in the client apparatus 20, and therefore, arbitrary use of the access token by a third party using the client apparatus 20 without permission is suppressed.

As the related art, a mechanism called single sign-on has been provided. Single sign-on is a technique in which user IDs and passwords, which are plural pieces of authentication information each registered in the corresponding service providing apparatus 10, are retained in the relay apparatus 30, for example, each of the plural pieces of authentication information being associated with the corresponding service providing apparatus 10, and the relay apparatus 30 handles login to a cloud service provided by each service providing apparatus 10. In this mechanism, however, the relay apparatus 30 retains personal information, such as user IDs and passwords, which is authentication information, and therefore, there may be a risk of leakage of such personal information to a third party. According to the exemplary embodiment described above, however, the relay apparatus 30 relays data from the client apparatus 20 to the service providing apparatus 10 without retaining a user ID or a password registered in the service providing apparatus 10, and therefore, such a risk is reduced.

3. Modifications

The exemplary embodiment described above is an example of the present invention. The exemplary embodiment may be modified as follows. Modifications described below may be combined with one another.

(1) In the case where the second option or the third option is selected in the above-described exemplary embodiment, an expiration date may be set for the access token. The expiration date that is to be set may be a date determined in advance by the relay apparatus 30, or may be set by operations performed by the owner of the client apparatus 20, for example. In the latter case, operations as described below are performed, for example.

When the URL 62 or the URL 63 is selected in step S206 described above, the browser 422 of the portable terminal 40-1 displays on the display 45 a setting screen 451 used to set an expiration date. FIG. 23 is a diagram illustrating an example of the setting screen 451 according to the modification. The setting screen 451 includes an input field 452 used to input an expiration date and a set button 453. The owner performs operations for inputting an expiration date in the input field 452 and pressing the set button 453, by using the operation unit 44. The browser 422 transmits the expiration date that has been input to the relay apparatus 30.

In the memory 32 of the relay apparatus 30, an authentication table 324 is stored instead of the authentication table 323 described above. FIG. 24 is a diagram illustrating an example of the authentication table 324 according to the modification. Records that form the authentication table 324 each include a field "expiration date" in addition to the fields of "apparatus ID", "mail address", and "authentication status". In the "expiration date" field, the expiration date set for the access token is stored.

The permission unit 316 stores the expiration date received from the portable terminal 40-1 in the authentication table 324 in the second permission processing in step S302 described above or the third permission processing in step S409 described above. For example, in the example illustrated in FIG. 19, in a case where the expiration date received from the client apparatus 20 is "3/31/2014", the expiration date "3/31/2014" is stored in a new record of the authentication table 324 together with the apparatus ID "XXX", the mail address "a@example.com", and the authentication status "authentication with limitation completed", as illustrated in FIG. 24.

When accessing the service providing apparatus 10 in step S304 or S411 described above, the access unit 317 determines whether or not the access token is valid on the basis of the expiration date stored in the authentication table 324. Specifically, in a case where an access request that contains the apparatus ID "XXX" has been received in step S303 described above, for example, the access unit 317 refers to the expiration date "3/31/2014" that has been stored in the authentication table 324 illustrated in FIG. 24 in association with the apparatus ID "XXX". If the access token does not expire, the access unit 317 determines that the access token is valid. In this case, the access unit 317 accesses the service providing apparatus 10 using the access token, as described in the exemplary embodiment. On the other hand, if the access token expires, the access unit 317 determines that the access token is not valid. In this case, the relay apparatus 30 rejects the access request from the client apparatus 20.

(2) A method for limiting functions available from the service providing apparatus 10 is not limited to a method using plural access tokens with different types of authority. For example, in a case where only one type of access token is issued from the service providing apparatus 10, the relay apparatus 30 may limit operations that are allowed to be performed with the access token.

In this modification, the permission unit 316 permits performing of some operations that have been set for the access token, in the second permission processing in step S302 described above. For example, in a case where operations of data storage, browsing, editing, and deletion have been set for the access token, of these operations, only data browsing, for example, is permitted.

When accessing the service providing apparatus 10 in step S304 described above, the access unit 317 determines whether or not an operation requested by the client apparatus 20 is included in operations that are permitted for the access token. If the operation requested by the client apparatus 20 is included in the permitted operations, the access unit 317 accesses the service providing apparatus 10 using the access token, as described in the exemplary embodiment. On the other hand, if the operation requested by the client apparatus 20 is not included in the permitted operations, the relay apparatus 30 rejects the access request from the client apparatus 20.

(3) A method for selecting the first to fourth options is not limited to a method using URLs. For example, in the body of the email 60, a URL that indicates a storage location of data for a selection screen used to select the first to fourth options may be included instead of the URLs 61 to 64. In this case, when the email 60 is displayed in step S205 described above, the user A performs operations for selecting the URL using the operation unit 44. The browser 422 of the portable terminal 40-1 accesses the data stored in the location indicated by the selected URL, and displays the selection screen on the display 45. In the selection screen, the first to fourth options are displayed. The owner performs operations for selecting one of the options using the operation unit 44. The browser 422 transmits selection information indicating the selected option to the relay apparatus 30. The relay apparatus 30 determines which of the options has been selected on the basis of the selection information received from the portable terminal 40-1.

Alternatively, in step S204 described above, instead of the email 60 described above, four emails corresponding to the first to fourth options may be transmitted from four different transmission sources respectively. When these emails are displayed in step S205, the user A performs operations for returning a reply to an email corresponding to an option selected from among the first to fourth options to the corresponding transmission source, using the operation unit 44. The relay apparatus 30 determines which of the options has been selected on the basis of which of the four transmission sources the reply to the corresponding email has been returned to. This method is useful in a case where the locations indicated by the URLs 61 to 64 are not easily accessible, such as in a case where the portable terminal 40 does not include the browser 422, for example.

(4) In the case where the third option is selected in the above-described exemplary embodiment, the owner may be notified of a user who uses the client apparatus 20. In this case, if the user who is to use the client apparatus 20 is an undesired user, the owner may reject use of the service providing apparatus 10 from the client apparatus 20.

In this modification, when the location indicated by a URL 65 is accessed from the portable terminal 40-2 in step S408 described above, the transmission unit 314 transmits an email addressed to the mail address of the owner of the client apparatus 20 similarly to step S204 described above. In the body of the email, the mail address received in step S404 or user information corresponding to the mail address is included. The mailer 421 of the portable terminal 40-1 displays the email received from the relay apparatus 30 on the display 45. The user A recognizes the user of the client apparatus 20 from the mail address or the user information included in the body of the email. In a case of permitting use by the user, the user A performs operations for permitting the use, by using the operation unit 44. On the other hand, in a case of rejecting use by the user, the user A performs operations for rejecting the use, by using the operation unit 44. The portable terminal 40-1 transmits to the relay apparatus 30 permission/rejection information indicating permission or rejection of use on the basis of the operations performed by the user A. If the permission/rejection information received from the portable terminal 40-1 indicates permission of use, the processing proceeds to step S409 descried above, in the relay apparatus 30. On the other hand, if the permission/rejection information received from the portable terminal 40-1 indicates rejection of use, the processing proceeds to step S502 descried above, in the relay apparatus 30.

(5) In the above-described exemplary embodiment, the present position of the client apparatus 20 may be communicated to the owner of the client apparatus 20 using the email 60. The present position of the client apparatus 20 is used in determination of whether or not the client apparatus 20 is illegally used.

In this modification, the client apparatus 20 includes a positioning unit that determines the present position. As the positioning unit, a global positioning system (GPS) receiver is used, for example. In step S202, a use check request containing position information that indicates the position determined by the positioning unit is transmitted to the relay apparatus 30. In step S204, the email 60 that includes the position information is transmitted. When the email 60 is displayed in step S205, the user A recognizes the present position of the client apparatus 20 from the position information included in the email 60. If the present position of the client apparatus 20 is different from the position where the client apparatus is usually used, the client apparatus 20 may be illegally used. In this case, the owner performs operations for selecting the URL 64, for example, to thereby reject use of the service providing apparatus 10.

In the case where the fourth option is selected, the relay apparatus 30 may prohibit use of the client apparatus 20. In this case, the relay apparatus 30 transmits to the client apparatus 20 control information for prohibiting use of the client apparatus 20. When the client apparatus 20 receives the control information, the client apparatus prohibits use of the client apparatus 20 by the user, by not accepting operations or not performing operations, for example. As a result, use of the client apparatus 20 without permission is suppressed.

(6) The email 60 does not necessarily include plural URLs. For example, the email 60 may only include the URL 61. In this case, only the operations described in "(2-1) Case of Permitting Use of All Functions" are performed.

(7) The application 221 may be activated when the power of the client apparatus 20 is turned on, without operations performed by a user. In this case, when the power of the client apparatus 20 is turned on, the use processing described above is started.

(8) A use log regarding the service providing apparatus 10 may be recorded in the client apparatus 20. For example, in a case where the user B uses the client apparatus 20 to store data in the service providing apparatus 10, log information including the mail address of the user B, the date and time when the processing was performed, and the details of the processing is stored in the memory 22.

(9) In the above-described exemplary embodiment, the permission unit 316 may be configured not to simply store in the authentication table 323 the apparatus ID "XXX", the mail address "a@example.com", and the authentication status "rejected" in the rejection processing in step S502. Even in this method, an access request that is transmitted from the client apparatus 20 is rejected.

(10) The client apparatus 20 is not limited to an image processing apparatus. For example, the client apparatus 20 may be a digital camera, a video camera, a personal computer, a portable telephone, a smartphone, or a tablet terminal. The client apparatus 20 may be any apparatus as long as the apparatus receives services provided by the service providing apparatus 10. The portable terminal 40 is not limited to the apparatus described in the exemplary embodiment. The portable terminal 40 may be any apparatus as long as the apparatus is used by a user.

(11) A program executed in the relay apparatus 30, a program executed in the client apparatus 20, and a program executed in the portable terminal 40 may be downloaded via the communication line 2, such as the Internet. These programs may be recorded in a computer readable recording medium, such as a magnetic recording medium (a magnetic tape, a magnetic disk, or the like), an optical recording medium (an optical disk or the like), a magneto-optical recording medium, or a semiconductor memory, and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a memory that stores
      i) an identification of a client apparatus owned by a first user and from which the first user accesses a service,
      ii) a first mail address assigned to the first user, and
      iii) first permission information indicating that the first user has authority to use the service, while associating the identification, the first mail address, and the first permission information with one another;
   a transmission unit that
      transmits to the client apparatus, in a case where the identification of the client apparatus has been received, a first email addressed to the first mail address of the first user stored in association with the identification of the client apparatus that has been received,
      transmits to the client apparatus, in a case where the information processing apparatus receives a reply to the first email granting permission to a second user to access the service with the client apparatus using second permission information, a request for the email address of the second user who will use the service with the second permission information, and
      transmits, in response receipt of the second user's email address, a second email addressed to the second user's email address; and
   a permission unit that permits,
      i) in a case where a reply corresponding to contents of the first email has been received via a terminal, use of the service by the client apparatus in accordance with the first permission information stored in association with the first mail address, and
      ii) in a case where a reply corresponding to the contents of the second email has been received from a terminal of the second user, use of the service by the client apparatus in accordance with the second permission information.

2. The information processing apparatus according to claim 1, further comprising:
   an access unit that accesses, in a case where use of the first permission information has been permitted, a service providing apparatus using the first permission information in response to a request from the client apparatus.

3. The information processing apparatus according to claim 1, wherein
   the transmission unit transmits to the terminal a plurality of options regarding permission or rejection of use of the service, and
   the permission unit permits, in a case where a first option among the plurality of options has been received from the terminal as the reply, use of the service using the first permission information.

4. The information processing apparatus according to claim 3, wherein
   the memory stores third permission information in association with the first mail address, the third permission information indicating that the first user has authority to use the service, the third permission information limiting use of the service compared with the first permission information,
   the permission unit permits, in a case where a second option among the plurality of options has been received from the terminal as the reply, use of the third permission information stored in association with the first mail address, and the access unit permits, in a case where use of the third permission information has been permitted, use of the service using the third permission information instead of the first permission information.

5. The information processing apparatus according to claim 3, wherein one or more operations, performing of which is permitted under the authority, are set for the first permission information, the permission unit permits, in a case where a second option has been selected by the terminal as the reply from among the plurality of options, performing of one or some of the operations that have been set, and the access unit permits, in a case where an operation, a request for which has been made from the client apparatus, is included in one or some of the operations, performing of which has been permitted, use of the service using the first permission information, and performs the operation that has been requested.

6. The information processing apparatus according to claim 5, further comprising:

a request unit that requests, in a case where a third option has been selected by the terminal from among the plurality of options, input of the second mail address, to the client apparatus, wherein the memory stores the second mail address assigned to the second user and the second permission information indicating that the second user has authority to use the service, while associating the second mail address and the second permission information with each other, the transmission unit transmits, in a case where the second mail address has been received from the client apparatus, the second email addressed to the second mail address that has been received, the permission unit permits, in a case where access from the terminal of the second user has been received in accordance with contents of the second email, use of the second permission information stored in association with the second mail address, and the access unit permits, in a case where use of the second permission information has been permitted, use of the service using the second permission information instead of the first permission information.

7. The information processing apparatus according to claim 5, wherein the permission unit rejects the request in a case where a fourth option has been selected by the terminal from among the plurality of options.

8. A communication system that includes a client apparatus owned by a first user and from which the first user accesses a service, a terminal used by the first user, a terminal used by a second user, and an information processing apparatus, the information processing apparatus including
a memory that stores
i) an identification of the client apparatus owned by the first user and from which the first user accesses the service,
ii) a first mail address assigned to the first user, and
iii) first permission information indicating that the first user has authority to use the service, while associating the identification, the first mail address, and the first permission information with one another, a first transmission unit that
transmits to the client apparatus, in a case where the identification of the client apparatus has been received, a first email addressed to the first mail address of the first user stored in association with the identification of the client apparatus that has been received, transmits to the client apparatus, in a case where the information processing apparatus receives a reply to the first email granting permission to the second user to access the service with the client apparatus using second permission information, a request for the email address of the second user who will use the service with the second permission information, and transmits, in response receipt of the second user's email address, a second email addressed to the second user's email address, a permission unit that permits
i) a case where access via the terminal used by the first user has been received in accordance with contents of the first email, use of the service by the client apparatus in accordance with the first permission information stored in association with the first mail address, and ii) in a case where a reply corresponding to the contents of the second email has been received via the terminal used by the second user, use of the service by the client apparatus in accordance with the second permission information,
and a first access unit that uses the service permitted in accordance with the first permission information, and the second permission information, the terminal used by the first user including
a display that displays the first mail that has been received from the information processing apparatus,
an operation unit, and
a second access unit that accesses the information processing apparatus in a case where an operation for permitting use of the service has been performed using the operation unit, in accordance with contents of the first email, the client apparatus including
a second transmission unit that transmits the identification to the information processing apparatus, and
a request unit that makes a request to the information processing apparatus.

9. A non-transitory computer readable medium storing a program causing a computer to execute a process for information processing so as to function as an information processing apparatus, the computer including a memory that stores i) an identification of a client apparatus owned by a first user and from which the first user accesses a service, ii) a first mail address assigned to the first user, and iii) first permission information indicating that the first user has authority to use the service, while associating the identification, the first mail address, and the first permission information with one another, the process comprising:

transmitting to the client apparatus, in a case where the identification of the client apparatus has been received, a first email addressed to the first mail address of the first user stored in association with the identification of the client apparatus that has been received;

transmitting to the client apparatus, in a case where the information processing apparatus receives a reply to the first email granting permission to a second user to access the service with the client apparatus using second permission information, a request for the email address of the second user who will use the service with the second permission information;

transmitting, in response receipt of the second user's email address, a second email addressed to the second user's email address; and permitting,
    i) in a case where a reply corresponding to contents of the first email has been received via a terminal, use of the service by the client apparatus in accordance with the first permission information stored in association with the first mail address, and
    ii) in a case where a reply corresponding to the contents of the second email has been received from a terminal of the second user, use of the service by the client apparatus in accordance with the second permission information.

10. An information processing method performed by an information processing apparatus, comprising:

storing
    i) an identification of a client apparatus owned by a first user and from which the first user accesses a service,
    ii) a first mail address assigned to the first user, and
    iii) first permission information indicating that the first user has authority to use the service, while associating the identification, the first mail address, and the first permission information with one another;

transmitting to the client apparatus, in a case where the identification of the client apparatus has been received, a first email addressed to the first mail address of the first user stored in association with the identification of the client apparatus that has been received;

transmitting to the client apparatus, in a case where the information processing apparatus receives a reply to the first email granting permission to a second user to access the service with the client apparatus using second permission information, a request for the email address of the second user who will use the service with the second permission information;

transmitting, in response receipt of the second user's email address, a second email addressed to the second user's email address; and permitting,
    i) in a case where a reply corresponding to contents of the first email has been received via a terminal, use of the service by the client apparatus in accordance with the first permission information stored in association with the first mail address, and
    ii) in a case where a reply corresponding to the contents of the second email has been received from a terminal of the second user, use of the service by the client apparatus in accordance with the second permission information.

\* \* \* \* \*